(12) United States Patent
Laal

(10) Patent No.: US 11,134,279 B1
(45) Date of Patent: Sep. 28, 2021

(54) VALIDATION OF MEDIA USING FINGERPRINTING

(71) Applicant: Amazon Technologies, Inc., Seattle, WA (US)

(72) Inventor: Sepehr Laal, Lake Oswego, OR (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 15/662,123

(22) Filed: Jul. 27, 2017

(51) Int. Cl.
| H04N 21/234 | (2011.01) |
| H04N 21/242 | (2011.01) |
| H04N 21/233 | (2011.01) |
| H04N 21/647 | (2011.01) |
| H04N 21/236 | (2011.01) |
| H04N 21/2343 | (2011.01) |
| H04L 29/06 | (2006.01) |

(52) U.S. Cl.
CPC ..... *H04N 21/23418* (2013.01); *H04N 21/233* (2013.01); *H04N 21/236* (2013.01); *H04N 21/234309* (2013.01); *H04N 21/242* (2013.01); *H04N 21/647* (2013.01); *H04L 65/602* (2013.01); *H04L 65/80* (2013.01)

(58) Field of Classification Search
CPC ........... H04N 21/233; H04N 21/23418; H04N 21/234309; H04N 21/242; H04N 21/647; H04N 21/236; H04L 65/602; H04L 65/80
USPC ................. 725/116, 135, 136; 709/231–232; 348/466, 515; 382/100, 173, 232–233
See application file for complete search history.

(56) References Cited

U.S. PATENT DOCUMENTS

| 8,817,183 | B2 | 8/2014 | Oostveen et al. |
| 8,947,595 | B1 | 2/2015 | Tucker et al. |
| 8,989,376 | B2 | 3/2015 | Ren et al. |
| 9,300,927 | B2 | 3/2016 | Hoogenstraaten et al. |
| 9,330,426 | B2 | 5/2016 | Davis |
| 9,367,887 | B1 | 6/2016 | Sharifi |
| 9,372,531 | B2 | 6/2016 | Benson et al. |
| 9,471,674 | B2 | 10/2016 | Ramanathan et al. |
| 9,495,451 | B2 | 11/2016 | Harron |
| 9,536,151 | B1 | 1/2017 | Postelnicu et al. |
| 9,544,621 | B2 | 1/2017 | Weich et al. |
| 9,554,176 | B2 | 1/2017 | Gharaat et al. |
| 2004/0153563 | A1* | 8/2004 | Shay ............... H04L 41/142 709/232 |
| 2005/0144455 | A1* | 6/2005 | Haitsma ........... G06F 17/30743 713/176 |

(Continued)

*Primary Examiner* — Kunal Langhnoja
(74) *Attorney, Agent, or Firm* — Robert C. Kowert; Kowert, Hood, Munyon, Rankin & Goetzel, P.C.

(57) ABSTRACT

Methods, systems, and computer-readable media for validation of media using fingerprinting are disclosed. A first plurality of fingerprints are generated based at least in part on contents of a first media comprising a first plurality of media elements. A second plurality of fingerprints are generated based at least in part on contents of a second media comprising a second plurality of media elements. The first and second media are associated with a transcode pipeline. A comparison is performed of the second plurality of fingerprints to the first plurality of fingerprints. The comparison determines whether a characteristic of the first media is maintained in the second media. Based at least in part on the comparison, the second media is determined to be valid or invalid.

20 Claims, 10 Drawing Sheets

(56) References Cited

U.S. PATENT DOCUMENTS

| | | | |
|---|---|---|---|
| 2010/0054537 A1* | 3/2010 | Bateman | G06K 9/6228 382/103 |
| 2011/0251896 A1* | 10/2011 | Impollonia | G06Q 30/02 705/14.55 |
| 2013/0128115 A1* | 5/2013 | Oostveen | G10L 25/48 348/515 |
| 2013/0263207 A1* | 10/2013 | Granstrom | G06F 21/10 726/1 |
| 2013/0291082 A1* | 10/2013 | Giladi | H04L 63/123 726/7 |
| 2013/0318253 A1* | 11/2013 | Kordasiewicz | H04L 65/80 709/231 |
| 2014/0075309 A1* | 3/2014 | Dingsor | G06F 16/435 715/716 |
| 2014/0140417 A1* | 5/2014 | Shaffer | H04N 21/23608 375/240.28 |
| 2015/0237298 A1* | 8/2015 | Garland | H04N 5/04 348/466 |
| 2016/0154625 A1* | 6/2016 | Stout | G06F 3/0481 715/716 |
| 2016/0366452 A1* | 12/2016 | Roessler | H04N 21/6112 |
| 2017/0193362 A1* | 7/2017 | Cremer | G06N 3/04 |
| 2018/0077445 A1* | 3/2018 | Puntambekar | H04N 21/4305 |

\* cited by examiner

Frame Conditions 800

| Duplicate | Expected | Matched | Condition ID | Description |
|---|---|---|---|---|
| No | No | No | 0/A | Entirely unexpected frame (noise) |
| No | No | Yes | 1/B | |
| No | Yes | No | 2/C | |
| No | Yes | Yes | 3/D | |
| Yes | No | No | 4/E | Frame matched somewhere unexpected |
| Yes | No | Yes | 5/F | Duplicate frame which does not match any known frames |
| Yes | Yes | No | 6/G | Good expected frame |
| Yes | Yes | Yes | 7/H | Duplicate frame which matches known frame |

FIG. 8

VALIDATION OF MEDIA USING FINGERPRINTING

BACKGROUND

Internet-based media streaming is increasingly the choice of viewers who seek convenient access to video outside of conventional video distribution channels (including over-the-air broadcasts, cable TV, satellite TV, and prerecorded physical media). Using streaming technologies, viewers may access channels of live media (e.g., video) as well as prerecorded media from libraries of media assets that are accessible over an Internet connection. In some cases, streaming media is viewable on a wide range of devices, including desktop computers and laptop computers, tablets, smartphones, wearable computers, and specialized devices such as smart televisions. The flexibility and convenience of streaming media are responsible in part for its widespread adoption.

The distribution and delivery pipeline for streaming media is typically a complicated one. A media asset or live stream may first be acquired, e.g., from a broadcaster. The media may then be processed and transformed in any of several ways—potentially including compression, encryption, and other forms of encoding—for eventual distribution to viewers. A hierarchy of servers over a wide geographical area may be used to deliver the media to many viewers in an efficient manner. However, the processing and transformation of the media prior to delivery may produce undesirable effects that a viewer may notice, such as reducing the quality of the media or desynchronizing elements of the media.

BRIEF DESCRIPTION OF THE DRAWINGS

FIG. 8 illustrates a chart of frame conditions associated with validation of media using fingerprinting, according to one embodiment.

Figure 1:
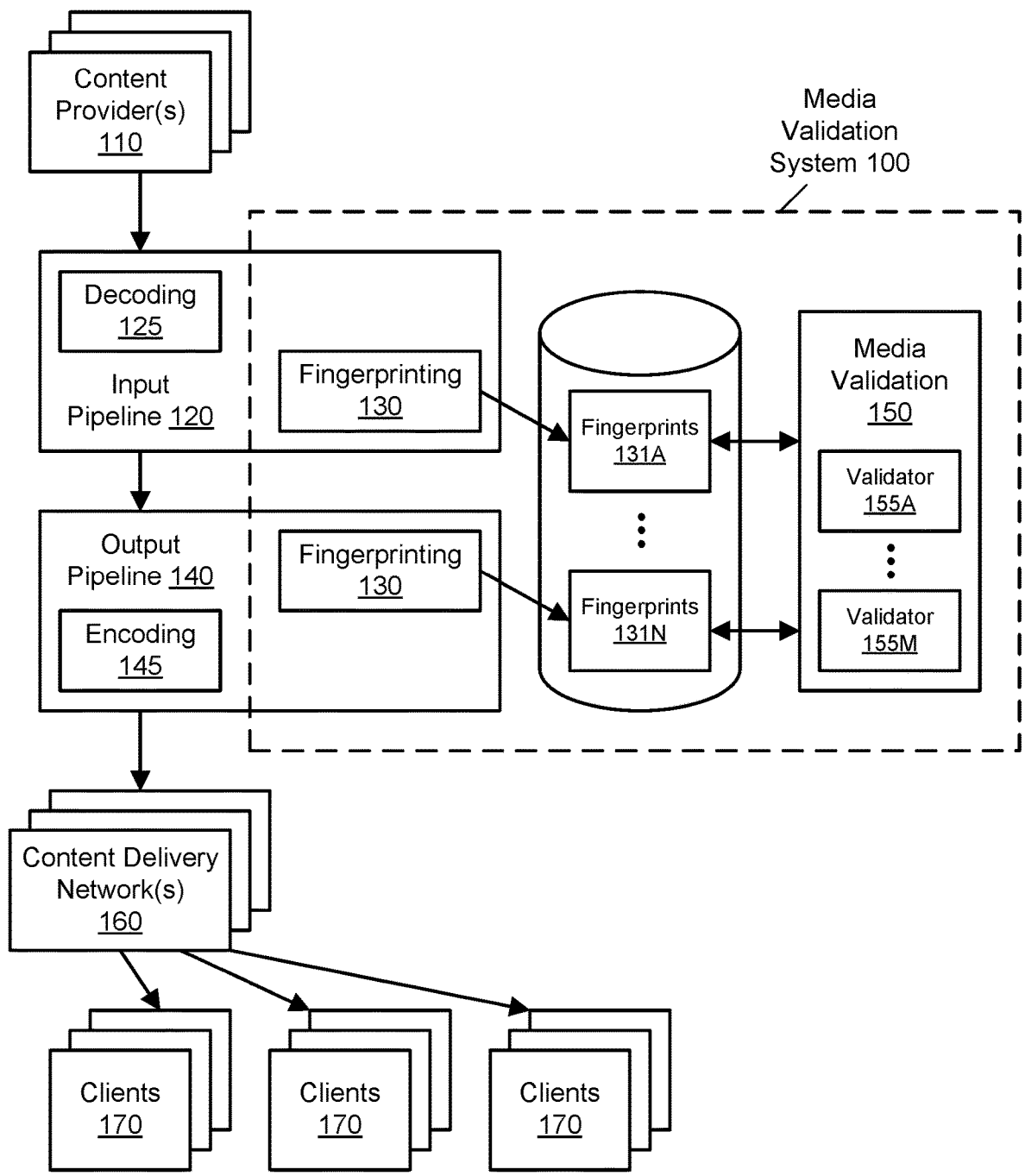
FIG. 1 illustrates an example system environment for validation of media using fingerprinting, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for validation of media using fingerprinting are described. Using the techniques described herein, media such as video and/or audio may be automatically validated prior to delivery to end users. Instead of relying on human perception in viewing or listening to media and assessing the encoding quality, a media validation system may employ one or more validation algorithms to validate or invalidate particular media files or streams using per-frame fingerprints. The validation may determine whether one or more characteristics are preserved or maintained from one encoding of the media to another encoding of the media. For example, the validation may determine whether audio and video remain synchronized in a media encoding. As another example, the validation may determine whether a sufficient level of detail is preserved in a media encoding. In general, different validators representing different algorithms or approaches may be used with the media validation system to assess different characteristics. To perform the validation, fingerprints may be generated for individual frames within a first media file or stream (referred to as a source) and also within a second media file or stream (referred to as a sink). The first (source) media may represent input from a content provider to a transcode pipeline or output of a transcode pipeline. The second (sink) media may represent output of a transcode pipeline and may represent a different encoding of the same underlying source. For a given frame (e.g., a video frame and/or audio samples associated with a frame), a fingerprint may capture a feature vector of video, audio, captions, or metadata. The fingerprints of the source media may be compared to the fingerprints of the sink media using one or more validators. Based (at least in part) on the comparison, the encoding of the second (sink) media may be deemed valid or invalid. Fingerprints may be stored in a repository and/or cached at the media validation system even after the corresponding media has been discarded. In one embodiment, using the media validation system, the quality of a media file or stream may be assessed without necessarily relying on manual review of the media by humans.

FIG. 1 illustrates an example system environment for validation of media using fingerprinting, according to one embodiment. A media delivery pipeline may stream or otherwise provide media, such as digital video or audio or a combination thereof, to client computing devices 170 for further processing and/or playback using those devices. The media may represent live media content (e.g., a live stream associated with a particular channel) or prerecorded media content (e.g., a media asset from a library of media). The media delivery pipeline may include multiple stages; the stages may represent various transformations of the media and/or various distribution paths for the media (e.g., from device to device over the internet). The media delivery pipeline may include an input pipeline 120 and an output pipeline 140. In one embodiment, the input pipeline 120 and output pipeline 140 may collectively be referred to as a transcode pipeline in which a media file or stream is converted from one encoding to another encoding. A media stream may comprise a multichannel media stream in which multiple channels of content are packaged together. The multiple channels may typically represent different content, and a recipient may select one of the channels from the multichannel stream (e.g., for viewing). Alternatively, a media stream may comprise a single channel of media. Media files or streams processed using the transcode pipeline may include video, audio, captions, metadata, and/or other elements of a media container.

A media validation system 100 may be used with the media delivery pipeline to provide automated assessment of media quality using fingerprints. At one or more points in the transcode pipeline, the media validation system 100 may perform fingerprinting 130 of elements of media passing through the pipeline. The elements of media may include, for example, video frames and/or audio samples (with a set of samples being associated with a single frame). In one embodiment, the contents of input media acquired from a content provider 110 may be subjected to fingerprinting 130 before the media is transcoded by the transcode pipeline. In one embodiment, input media may be decoded and then re-encoded (e.g., using an encoding component 145) in the transcode pipeline, and the contents of the resulting output media may be subjected to fingerprinting 130. In one embodiment, the fingerprinting 130 may generate a fingerprint for each consecutive element (e.g., each video frame or set of audio samples associated with a video frame) of the media. In one embodiment, the fingerprinting 130 may generate a fingerprint not necessarily for each consecutive element, e.g., for every Nth frame of the media. The fingerprinting 130 may use any suitable algorithm(s) for capturing a feature vector of a frame of media. The resulting fingerprints 131A through 131N may be stored in one or more databases or repositories. In one embodiment, the fingerprints 131A-131N may be maintained in the databases and/or repositories even after the corresponding media is no longer present at the transcode pipeline. An individual fingerprint may be significantly smaller in size than the corresponding frame of media. In one embodiment, a fingerprint may take the form of a 64-character hash that corresponds to or captures features of a frame of media.

The fingerprints 131A may represent a different encoding of the same underlying media as the fingerprints 131N. For example, the fingerprints 131A may represent a source media acquired by the transcode pipeline, while the fingerprints 131N may represent an output encoded by the transcode pipeline. As another example, the fingerprints 131A may represent an output encoded by the transcode pipeline, while the fingerprints 131N may represent an output encoded in a different way (e.g., using a different encoder) by the transcode pipeline. Using a media validation component 150, the fingerprints 131A may be compared to the fingerprints 131N to assess whether one or more characteristics of the first (source) media are maintained in the second (sink) media. For example, the validation 150 may determine whether audio and video remain synchronized in a media encoding by analysis of the fingerprints 131A and 131N. As another example, the validation 150 may determine whether a sufficient level of detail is preserved in a media encoding by analysis of the fingerprints 131A and 131N. As yet another example, the validation 150 may determine whether a relative absence of noise is preserved in a media encoding by analysis of the fingerprints 131A and 131N. In general, different validators representing different algorithms or approaches may be used with the media validation system 100 to assess different characteristics of media. As shown in the example of FIG. 1, the media validation component 150 may employ any of validators 155A through 155M to validate or invalidate a media stream or file.

The client computing devices 170 may be associated with and/or operated by one or more clients of the media delivery pipeline; as used herein, the terms "client computing device," "client device," and "client" may be used interchangeably. The client computing devices 170 may be coupled to portions of the media delivery pipeline via one or more networks, potentially including the Internet. A client may represent a customer (e.g., an individual or group) of the media delivery pipeline. Typically, a user associated with one of the client computing devices 170 may have an account that has privileges to access media content provided by the media delivery pipeline. The access may be fee-based or may instead be free to the user (potentially with advertisements in the streaming media or player software). However, some media may also be streamable to users without accounts or other arrangements, e.g., on websites that provide streaming video.

It is contemplated that the media delivery pipeline may include various combinations of pipelines, stages, or other components, including the particular combination illustrated in FIG. 1 for purposes of example. In one embodiment, a media streaming system may use these various pipelines, stages, or other components to implement operations such as acquisition, frame synchronization, encoding, packaging, and distribution of streaming media. For example, the input pipeline 120 may implement operations such as acquisition, demultiplexing (demuxing), and/or decoding 125 of media. At the acquisition stage, a signal representing the media may be acquired from one or more content providers 110, e.g., broadcasters. The signal may be acquired by the media delivery pipeline using any of several suitable transport mechanisms, including a serial digital interface (SDI), a camera feed, a microphone feed, an internet protocol (IP) connection, an asynchronous serial interface (ASI) connection, and so on. As acquired, the media may include components such as video, audio, captions, and other metadata, and demultiplexing may partition the media into those constituent elements. Demultiplexing may also include partitioning a multichannel stream into individual channels. Additionally, the input pipeline 120 may perform decoding 125 of the video and/or audio components of the acquired media. The decoding 125 may transform the video and/or audio from one form to another, e.g., into a form that is usable by downstream components in the output pipeline 140.

In one embodiment, between the input pipeline 120 and the output pipeline 140, a frame synchronizer may control the latency of frames by passing frames at regular intervals. Frames may be passed to the output pipeline 140 or discarded based (at least in part) on their internal timestamps and not necessarily on their time of arrival at the input pipeline 120 or frame synchronizer. Frames may be passed to the output pipeline 140 according to deadlines for frame output. The deadlines may also be referred to as send times, and in one embodiment, frames may be passed only at (or near) the send times and not in between the send times. Using the frame synchronizer, the timestamps of frames may be compared to the deadlines for frame output within the domain of a system clock associated with the frame synchronizer. For example, if a frame's timestamp indicates that it the frame has arrived late relative to the deadline to output the next frame, then the frame may be discarded. The frame synchronizer may also transmit fill frames, e.g., if no frame is ready when a deadline is reached (e.g., if timestamp(s) indicates that frame(s) have arrived early relative to the deadline). A fill frame may represent a repeated frame, a blank frame, or a frame displaying a user-supplied slate image. When the current frame or a fill frame is passed to the output pipeline 140, the deadline for frame output may be updated accordingly. Using the frame synchronizer to pace output and insert fill frames if needed, the impact of input disruptions on the net duration of live video events may be mitigated. In the case of input switching or input disruptions, use of the frame synchronizer may permit buffer underflows and overflows from occurring such that output may be produced smoothly. Additionally, gaps in the production of media may be limited in duration by use of the frame synchronizer to pace output and insert fill frames.

In one embodiment, the path between the input pipeline 120 and the output pipeline 130 may represent a transcode path in which delay, noise, and other undesirable artifacts may be introduced in transcoded media. The transcode path or output pipeline 140 may implement operations such as encoding 145, multiplexing (muxing), deinterlacing, frame rate conversion, application of graphics, scaling, watermarking, caption burn-in, and/or packaging of media. At the encoding stage 145, the media may be transformed into a particular video or audio format, e.g., using a particular codec. The encoding stage 145 may be implemented by a plurality of components, referred to herein as encoders, that may operate in parallel. The encoding 145 may also process audio and video separately. The encoders may differ in terms of the encoding tasks they perform. The encoding stage 145 may include compression, or a separate compression stage may be used in the pipeline. Additionally, at the encoding stage 145, the media may be divided into segments or chunks of a fixed or variable size. For example, the media may be divided into segments of approximately ten seconds in length for delivery via HTTP over TCP/IP.

Downstream from the encoding stage 145, the video outputs may be processed further and distributed to one or more clients 170. At a packaging stage, potentially within the output pipeline 140, the media may be packaged and multiplexed (or "muxed") for playback on particular playback software (referred to herein as a "player") and/or a particular type of client device (e.g., a particular category of smartphone). Multiplexing may include combining different components such as video, audio, captions, and metadata into a single data file or stream. In one embodiment, additional stages or sub-stages of the pipeline may perform additional transformations of the media, such as encryption performed at an encryption stage, scaling performed at a scaling stage, advertisement insertion performed at an advertisement insertion stage, and/or other types of image processing (e.g., color transformation) performed at an image processing stage. Alternatively, one of the additional transformations may be performed as a sub-stage of another stage such as the encoding stage 145. In some embodiments, the output pipeline 140 may replicate and pass elements to multiple outputs, each with its own encoder, to produce adaptive bitrate outputs.

In one embodiment, the media delivery pipeline may include distribution components such as one or more origin servers and a plurality of content delivery network (CDN) servers 160. The origin server(s) may act as distribution points to the CDN servers. The CDN servers 160 may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. Media may be sent from the origin server to one or more CDN servers. If other stages such as acquisition, encoding, and/or packaging are performed at the origin server, then the origin stage may include those stages or include corresponding sub-stages. However, it is also contemplated that the origin server stage may represent a distinct stage relative to the acquisition stage, encoding stage, and/or packaging stage. At the CDN stage 160, the media may be sent from CDN servers to client devices 170, e.g., as requested by the client devices. In one embodiment, the stages may also include a playback stage that represents attempted playback by a player (e.g., implemented in player software) on a client device 170.

In some embodiments, components of the media delivery pipeline such as servers, storage resources, and network resources may be implemented using resources of a provider network. The provider network may be set up by an entity such as a company or a public sector organization to provide one or more services (such as various types of cloud-based computing or storage) accessible via the Internet and/or other networks to clients. The provider network may include numerous data centers hosting various resource pools, such as collections of physical and/or virtualized computer servers, storage devices, networking equipment and the like (e.g., implemented using the example computing system 3000 described below with regard to FIG. 9), needed to implement and distribute the infrastructure and services offered by the provider network. In some embodiments, the provider network may provide computing resources and services, such as services associated with media processing in the media delivery pipeline; storage services, such as a block-based storage service, key-value based data stores, or various types of database systems; and/or any other type of network-based services. Clients may access these various services offered by provider network via one or more networks, potentially including the Internet. Likewise, network-based services may themselves communicate and/or make use of one another to provide different services. For example, computing resources offered in units called "instances," such as virtual or physical compute instances or storage instances, may make use of particular data volumes, providing virtual block storage for the compute instances.

The provider network may implement or provide a multi-tenant environment such that multiple clients (e.g., content providers 110 and/or clients 170) may access or use a particular resource or service in a substantially simultaneous manner. Functionality of all or part of the media delivery pipeline, such as the media validation system 100, may be offered to multiple clients (in a substantially simultaneous manner) in such a multi-tenant provider network, such that the same computational and storage resources associated with the media validation system may be used on behalf of different clients over the same window of time. The different clients may represent different individuals and/or different organizations that may pay the provider network for access to one or more services and/or resources. The provider network may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network. In one embodiment, the fleet of servers may grow or shrink as individual servers are added to or removed from a dedicated fleet by an administrator.

The content providers 110 may represent individuals or entities who provide media content to the media delivery pipeline for potential delivery to the clients 170. The content providers 110 as illustrated in FIG. 1 may correspond to computing devices that are connected to the media validation system 100 over one or more networks, potentially including the Internet. The computing devices associated with the content providers 110 may encompass any type of hardware and software that are configurable to submit requests and/or media to the media delivery pipeline (e.g., implemented using the example computing system 3000 described below with regard to FIG. 9). Similarly, the computing devices associated with the clients 170 may encompass any type of hardware and software that are configurable to consume media provided by the media delivery pipeline (e.g., implemented using the example computing system 3000 described below with regard to FIG. 9). For example, a client computing device may include a dedicated media player, a suitable version of a web browser, and/or a plug-in module or other type of code module configured to execute as an extension to or within an execution environment provided by a web browser or other form of client software. In some embodiments, such a client application may include sufficient protocol support (e.g., for a suitable version of Hypertext Transfer Protocol [HTTP]) for generating and processing network-based service requests.

Content providers 110 and/or client computing devices 170 may convey network-based requests to the media delivery pipeline via one or more external networks. In various embodiments, the external network(s) may encompass any suitable combination of networking hardware and protocols necessary to establish network-based communications between computing devices and transcode pipeline and/or media validation system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given computing device and the media validation system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the media validation system 100. It is noted that in some embodiments, computing devices for content providers 110 and/or clients 170 may communicate with the media validation system 100 using a private network in addition to or instead of the public Internet.

Figure 9:
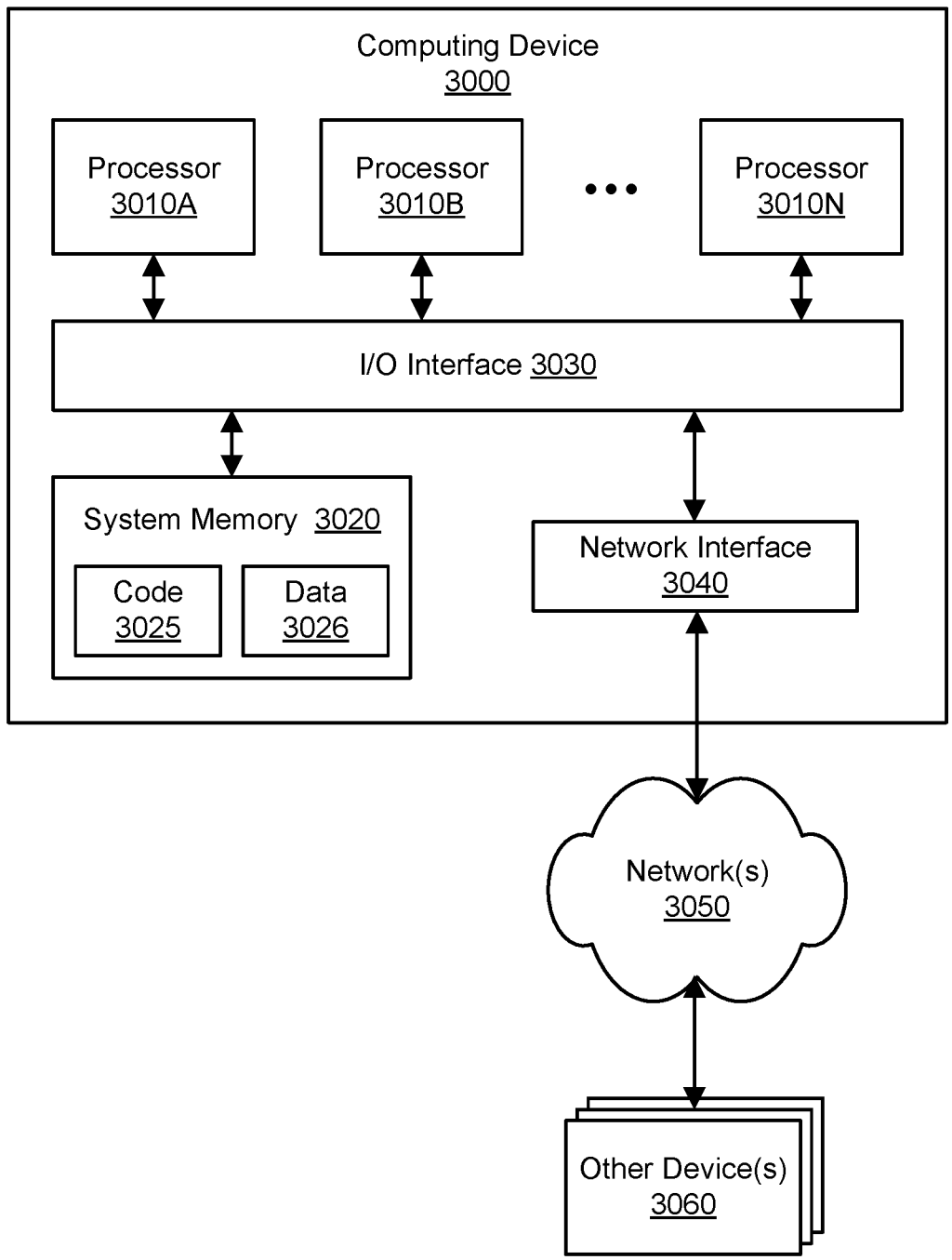
FIG. 9 illustrates an example computing device that may be used in some embodiments.

The media validation system 100 may include a plurality of computing devices, any of which may be implemented by the example computing device 3000 illustrated in FIG. 9. In various embodiments, portions of the described functionality of the media validation system 100 may be provided by the same computing device or by any suitable number of different computing devices. If any of the components of the media validation system 100 are implemented using different computing devices, then the components and their respective computing devices may be communicatively coupled, e.g., via a network. Each of the illustrated components (such as the input pipeline 120, fingerprinting 130, output pipeline 140, and media validation component 150) may represent any combination of software and hardware usable to perform their respective functions. Multiple computing devices may typically be used to implement the multi-stage pipeline. In some circumstances, more than one stage may be performed by the same computing device.

It is contemplated that the media validation system 100 may include additional components not shown, fewer components than shown, or different combinations, configurations, or quantities of the components shown. For example, although various components such as the input pipeline 120, fingerprinting 130, output pipeline 140, and media validation component 150 are shown for purposes of example and illustration, it is contemplated that different quantities and configurations of components may be used. Aspects of the functionality described herein may be performed, at least in part, by components outside of the media validation system 100. Additionally, it is contemplated that some of the illustrated stages may include redundant components that collectively provide the functionality of a particular stage. The redundancy of components may permit the pipeline to be rerouted to bypass a problematic component in a particular stage. In one embodiment, the media validation system 100 and/or media delivery pipeline may be divided into multiple regions representing different zones within a provider network whose resources are used to implement the media validation system. The different regions may represent geographical divisions of underlying components, including different nations, states, political subdivisions, continents, arbitrary zones, or data centers. Each of the regions may implement a media delivery pipeline with multiple stages. Within each region, a particular stage may be implemented with redundancy.

Figure 2:
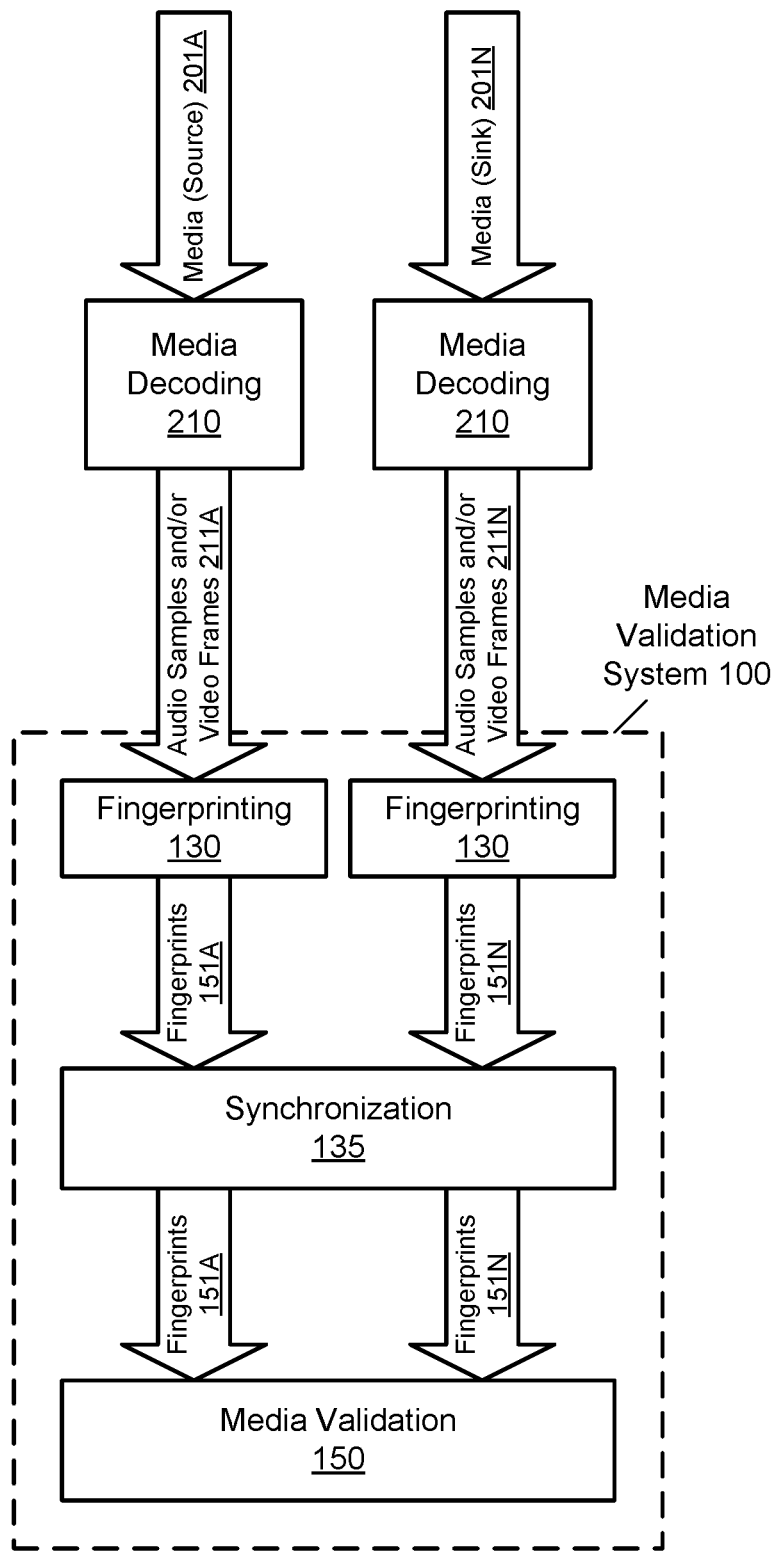
FIG. 2 illustrates further aspects of the example system environment for validation of media using fingerprinting, including fingerprinting both source media and sink media, according to one embodiment.

FIG. 2 illustrates further aspects of the example system environment for validation of media using fingerprinting, including fingerprinting both source media and sink media, according to one embodiment. As discussed above, a media validation system 100 may provide automated assessment of media quality using fingerprints. In one embodiment, using the media validation system 100, the quality of a media file or stream may be assessed without necessarily relying on manual review of the media by humans. In one embodiment, using the media validation system 100, the quality of a media file or stream may be assessed once by manual review (using one or more human reviewers) to establish a valid reference encoding, and the fingerprints of that valid encoding may be compared to those of future encodings of the same underlying media.

To perform a comparison, media validation system 100 may take as input the fingerprints associated with two encodings of the same underlying media file or stream. As shown in the example of FIG. 2, a first media content (a source) 201A may be subjected to media decoding 210. The media decoding 210 may produce one or more elements 211A associated with the content 201A, such as one or more video frames and/or audio samples. The frames and/or samples 211A may be subjected to fingerprinting 130 to produce a set of fingerprints 131A. Similarly, a second media content (a sink) 201N may be subjected to media decoding 210. The media decoding 210 may produce one or more elements 211N associated with the content 201N, such as one or more video frames and/or audio samples. The frames and/or samples 211N may be subjected to fingerprinting 130 to produce a set of fingerprints 131N. In one embodiment, the fingerprints 131A may represent content acquired by a transcode pipeline from a content provider, while the fingerprints 131N may represent an output encoded by the transcode pipeline. In one embodiment, the fingerprints 131A may represent an output encoded by the transcode pipeline, while the fingerprints 131N may represent an output encoded in a different way (e.g., using a different encoder) by the same transcode pipeline or by a different version of the transcode pipeline. In one embodiment, the source media 201A may be subjected to framerate conversion to generate different versions at different framerates, and fingerprints may be generated for each of the different framerates. When the sink media 201N is validated, the fingerprints representing the same framerate as the sink media may be retrieved and used for the comparison.

In one embodiment, the fingerprinting 130 may generate a fingerprint for each consecutive element (e.g., each video frame or set of audio samples associated with a video frame) of the media. In one embodiment, the fingerprinting 130 may generate a fingerprint not necessarily for each consecutive element, e.g., for every Nth frame of the media. The fingerprinting 130 may use any suitable algorithm(s) for capturing a feature vector of a frame of media. An individual fingerprint may be significantly smaller in size than the corresponding frame of media. In one embodiment, a fingerprint may take the form of a 64-character hash that corresponds to features of a frame of media. The fingerprints 131A may represent a different encoding of the same underlying media as the fingerprints 131N. In one embodiment, the fingerprints may be used to perform synchronization 135, e.g., of the sink media 201N to the source media 201A. In one embodiment, the synchronization may calculate a video delay and/or an audio delay between the start of the source media 201A and the start of the sink media 201N.

Using the media validation component 150, the fingerprints 131A may be compared to the fingerprints 131N to assess whether one or more characteristics of the first (source) media 201A are maintained in the second (sink) media 201N. For example, the validation 150 may determine whether audio and video remain synchronized in a media encoding by analysis of the fingerprints 131A and 131N. As another example, the validation 150 may determine whether a sufficient level of detail is preserved in a media encoding by analysis of the fingerprints 131A and 131N. As yet another example, the validation 150 may determine whether a relative absence of noise is preserved in a media encoding by analysis of the fingerprints 131A and 131N. In general, different validators representing different algorithms or approaches may be used with the media validation system 100 to assess different characteristics of media. The media validation system 100 may represent a framework with which various fingerprinting approaches and/or various validation approaches may be used.

Figure 3:
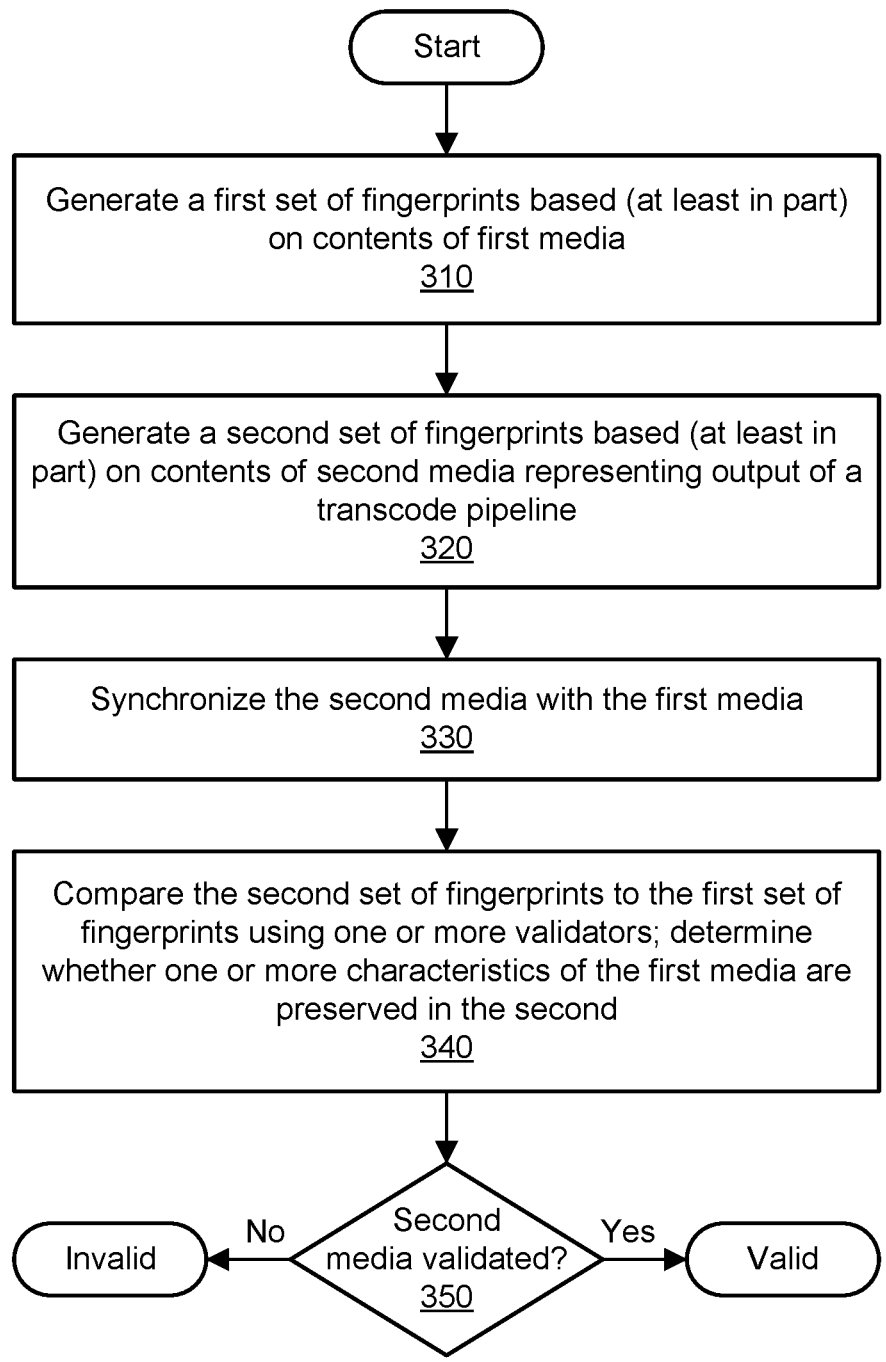
FIG. 3 is a flowchart illustrating a method for validation of media using fingerprinting, according to one embodiment.

FIG. 3 is a flowchart illustrating a method for validation of media using fingerprinting, according to one embodiment. As shown in 310, a first set of fingerprints may be generated based (at least in part) on contents of first media. The first media may represent input to or output of a transcode pipeline. The first media may include elements such as video frames and/or audio samples, and the fingerprinting may generate individual fingerprints corresponding to frames or sets of samples. The fingerprinting may use any suitable algorithm(s) for capturing a feature vector of an element of the media. The first set of fingerprints may be maintained in a database or repository. In one embodiment, each fingerprint of the first set of fingerprints may include a value such as a 64-character hash along with an identifier of the media element (e.g., video frame) to which the fingerprint corresponds. The first media may be assumed to have a valid encoding, e.g., based on its direct acquisition from a content provider (prior to being decoded and re-encoded in the transcode pipeline) or based on a manual review by one or more human viewers or listeners.

As shown in 320, a second set of fingerprints may be generated based (at least in part) on contents of second media. The second media may represent output of the transcode pipeline. Again, the second media may include elements such as video frames and/or audio samples, the fingerprinting may generate individual fingerprints corresponding to frames or sets of samples, and the fingerprinting may use any suitable algorithm(s) for capturing a feature vector of an element of the media. The second set of fingerprints may be maintained in a database or repository. In one embodiment, each fingerprint of the second set of fingerprints may include a value such as a 64-character hash along with an identifier of the media element (e.g., video frame) to which the fingerprint corresponds.

As shown in 330, the second media may be synchronized with the first media. In one embodiment, the fingerprints may be used to perform the synchronization. In one embodiment, the synchronization may calculate a video delay between the start of the first media and the start of the second media. In one embodiment, the synchronization may calculate an audio delay between the start of the first media and the start of the second media. The synchronization may ensure that corresponding frames in the first media and second media are compared to one another.

As shown in 340, the second set of fingerprints may be compared to the first set of fingerprints using one or more validators. By applying the validator(s) to the two sets of fingerprints, the method may determine whether one or more characteristics of the first media are preserved or maintained in the second media. The one or more characteristics may generally relate to the audio and/or visual quality of the contents and not necessarily to identifying the media for purposes of copyright enforcement. In one embodiment, the comparison may represent a frame-by-frame analysis of the two media. The comparison may be time-independent such that a fingerprint associated with frame N in the first media may be compared to a fingerprint associated with frame N in the second media. The validator(s) may represent algorithmic approaches and may be selected from a set of available validators based (at least in part) on the one or more characteristics that are sought to be analyzed in the two sets of fingerprints. For example, one validator may determine whether audio and video remain synchronized in a media encoding, while another validator may determine whether a sufficient level of detail or absence of noise is preserved in a media encoding. The application of the validator(s) may simulate a "Golden Eye" and/or "Golden Ear" review by human reviewers but in a deterministic manner that mitigates the various drawbacks associated with manual review, such as a lack of reproducibility.

As shown in 350, the method may determine whether the second media is valid or invalid based (at least in part) on the comparison of the fingerprints. For example, using one validator, the second media may be deemed valid if audio and video remain synchronized or may instead be deemed invalid if audio and video do not remain synchronized. As another example, using another validator, the second media may be deemed valid if a sufficient level of detail is preserved or may be deemed invalid if a sufficient level of detail is not preserved. As yet another example, using another validator, the second media may be deemed invalid if it includes a sufficient number of frames not found in the first media. The method may produce an appropriate report, e.g., by writing to a log and/or sending a message to a content provider, indicating the validity decision. In one embodiment, the operation of the media delivery pipeline may be altered automatically in response to an invalidity determination, e.g., by providing a different encoding of the media to end users rather than the invalid encoding, by changing (or recommending changes to) configuration parameters or aspects of the transcode pipeline to improve the quality of its output, and so on. In one embodiment, the media validation system may be used as part of a test suite for new versions of a transcode pipeline, and results of the validation testing may be provided to one or more users. For example, the media validation system may generate a report that indicates the degree of delay between the sink media and the source media, the degree of noise introduced in the transcode path, the type of noise introduced in the transcode path, and so on.

Figure 4:
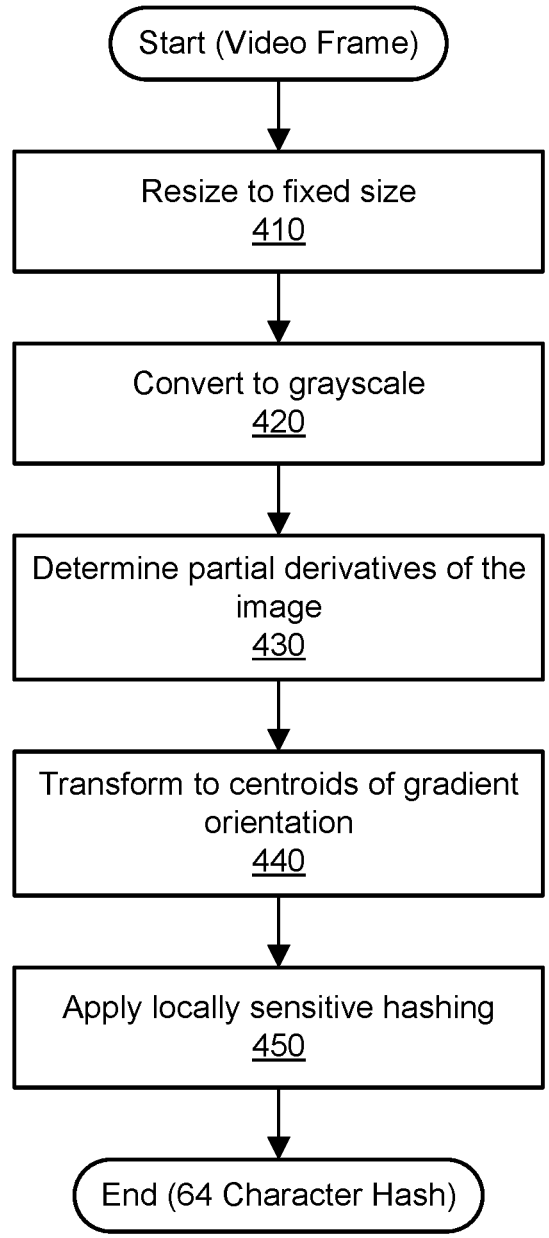
FIG. 4 is a flowchart illustrating a method for fingerprinting a frame of video, according to one embodiment.

FIG. 4 is a flowchart illustrating a method for fingerprinting a frame of video, according to one embodiment. The media validation system 100 may represent a framework usable with different approaches to fingerprinting, and the method shown in FIG. 4 represents an example of one such approach. In one embodiment, digital signal processing (DSP) techniques may be used to fingerprint discrete frames of video. As shown in 410, an input frame of video may be resized to a fixed size, such as a size associated with Common Intermediate Format (CIF) or Source Input Format (SIF). The frame may be resized using a cubic filter. Resizing may add resistance against aspect ratio or size changes in the input video, e.g., such that frames at different sizes with the same color content may reduce to the same fingerprint. As shown in 420, the resized frame may be converted to grayscale, e.g., by extracting the Y channel. As shown in 430, partial derivatives of the frame with respect to x and y may be calculated. As shown in 440, the partial derivatives may be transformed into polar coordinates or centroids of gradient orientation. The resulting polar magnitudes and angles may be divided into blocks, and their inner product may represent the final block's contribution to the fingerprint. Blocks may be adjusted to have bigger or smaller sizes, such that bigger blocks may yield less sensitive fingerprints and smaller blocks may yield more sensitive fingerprints. As shown in 450, a locally-sensitive hash (LSH) may be represented that represents a feature vector of the frame. The hash may be written to a database or repository and paired with an identifier of the frame (e.g., a frame number within the media content).

In one embodiment, to overcome the issue of time-related transcoding, a set of reference files may be fingerprinted to represent different framerates that may potentially be produced by a transcode pipeline. The set of reference files may be deemed valid using any suitable techniques, potentially including human review. Output of the transcode pipeline may be tested against one of these reference files having the same framerate as the output. A delay for video frames may be calculated by matching a fingerprint (e.g., a 64-character hash) in the sink video to a fingerprint in the source video. In one embodiment, the delay calculation may be performed prior to fingerprinting frames of video from the sink content.

Figure 5:
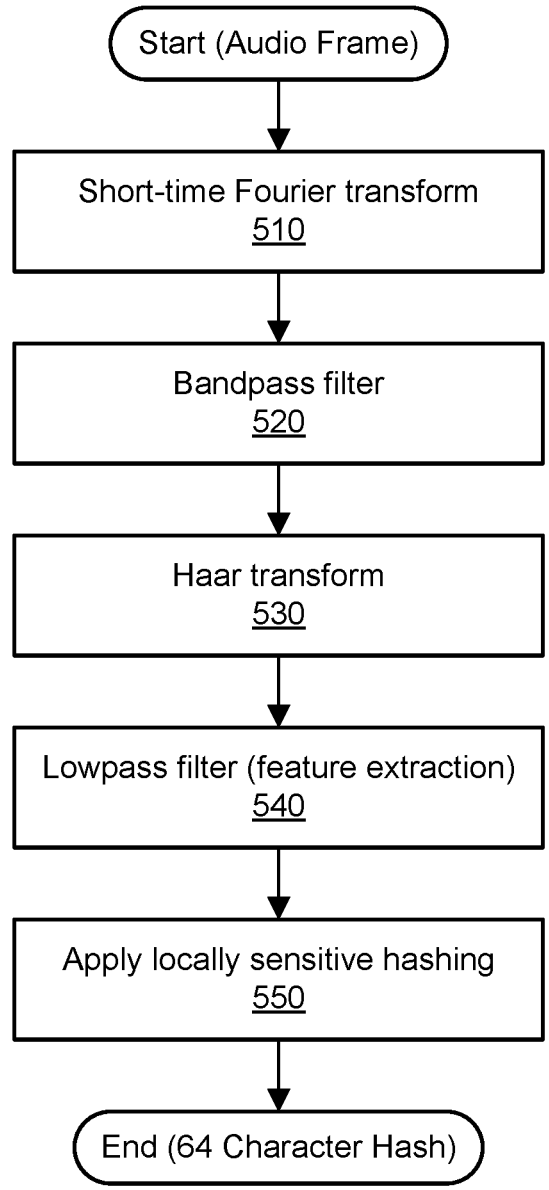
FIG. 5 is a flowchart illustrating a method for fingerprinting a frame of audio, according to one embodiment.

FIG. 5 is a flowchart illustrating a method for fingerprinting a frame of audio, according to one embodiment. The media validation system 100 may represent a framework usable with different approaches to fingerprinting, and the method shown in FIG. 5 represents an example of one such approach. A frame of audio may represent a sequence of audio samples, e.g., as associated with a frame of video, such as 1152 pulse-code modulation (PCM) samples. In one embodiment, digital signal processing (DSP) techniques may be used to fingerprint frames of audio. As shown in 510, a short-time Fourier transform (STFT) may be applied to the audio frame to take samples from the time domain to the frequency domain. As shown in 520, a bandpass filter (e.g., 300 Hz to 4000 Hz) may be applied to extract "important" contents in a typical audio file by eliminating lower frequency and higher frequency contents. As shown in 530, a Haar transform may be applied. As shown in 540, a lowpass filter may me applied to extract dominant features. As shown in 550, a locally-sensitive hash (LSH) may be represented that represents a feature vector of the frame. The LSH hashing may reduce the Haar output from two dimensions to one dimension. The hash may be written to a database or repository and paired with an identifier of the frame (e.g., a frame number within the media content).

Figure 6:
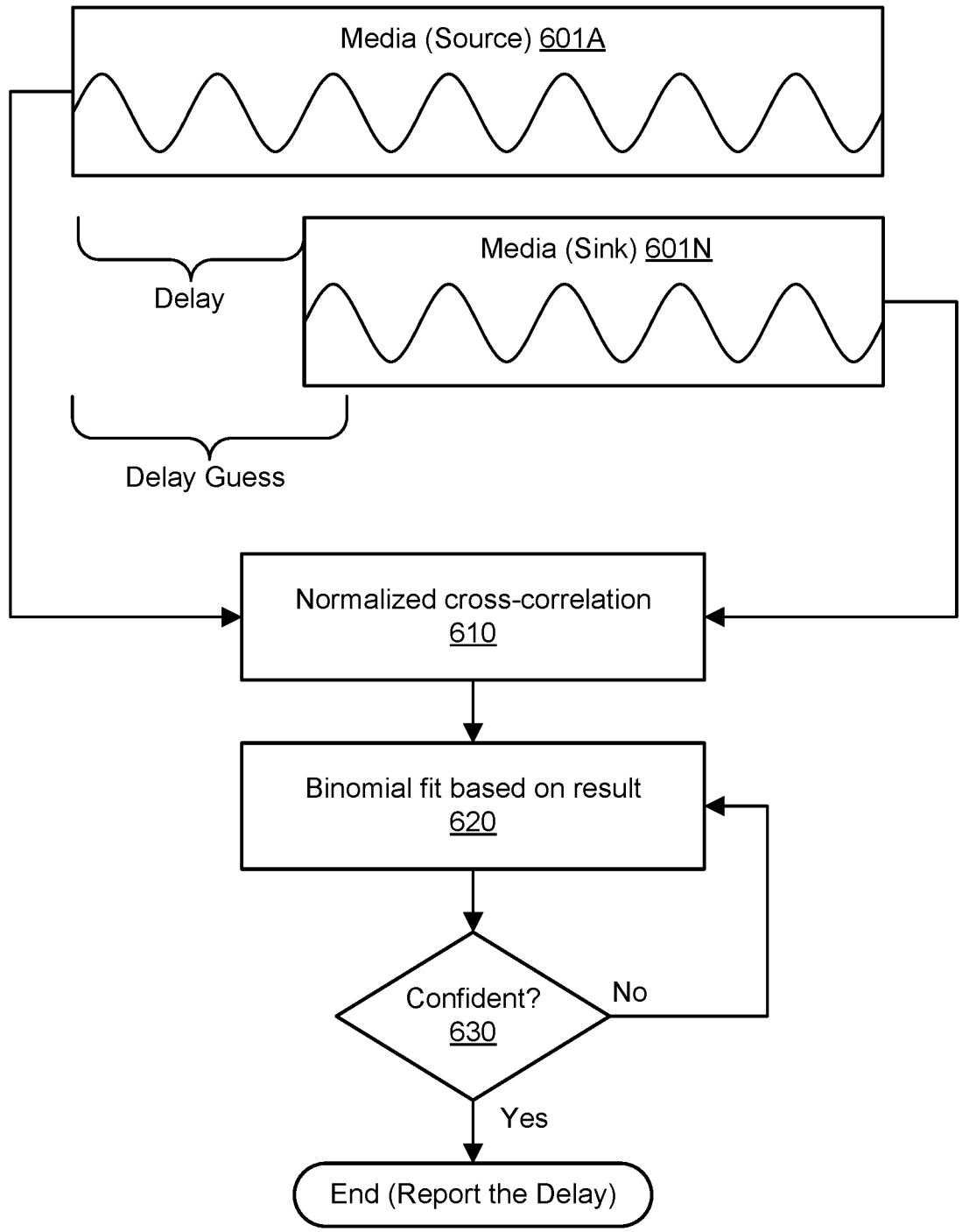
FIG. 6 illustrates a method for calculating a delay between a media source and a media sink, according to one embodiment.

FIG. 6 illustrates a method for calculating a delay between a media source and a media sink, according to one embodiment. In one embodiment, digital signal processing (DSP) techniques may be used to determine a delay between two media streams or files, e.g., a source media content 601A and a sink media content 601N. In one embodiment, the source 601A and sink 601N may include audio content. In one embodiment, an audio delay may be determined down to the granularity of a single sample. In one embodiment, the source 601A and sink 601N may include video content. In one embodiment, a video delay may be determined down to the granularity of a single frame. In one embodiment, the delay calculation may be performed prior to fingerprinting frames of media from the sink content 601N. In one embodiment, the delay may be determined using an iterative approach as illustrated in FIG. 6. As shown in 610, a cross-correlation of the two files 601A and 601N may be computed. The cross-correlation may be normalized for N top peaks. In the case of video, the cross-correlation may be four-dimensional; in the case of audio, the cross-correlation may be two-dimensional. As shown in 620, the binomial fit of the sink content 601N may be computed. As shown in 630, the method may determine whether the binomial fit of the sink content 601N reaches an acceptable level of confidence when fit with the source media. In one embodiment, to avoid reporting false delays, the delay calculation may be used if the sink content 601N is at least twice as long as a "delay guess."

Figure 7A:
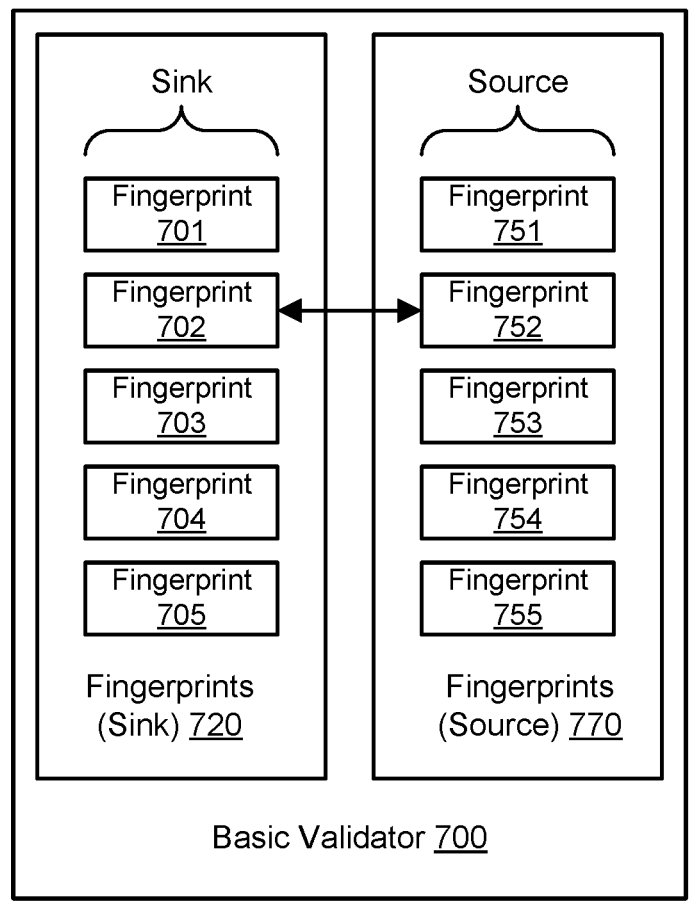
FIG. 7A illustrates a basic validator usable for validation of media using fingerprinting, according to one embodiment.

FIG. 7A illustrates a basic validator usable for validation of media using fingerprinting, according to one embodiment. As discussed above, the media validation system 100 may represent a framework that can employ different approaches to validation. For example, a basic validator 700 may be used to validate media content based on matching fingerprints. As shown in the example of FIG. 7A, the validator 700 may use fingerprints 720 associated with the sink media as well as fingerprints 770 associated with the source media. For example, the sink fingerprints 720 may include a sequence of sink fingerprints 701, 702, 703, 704, 705. The source fingerprints 770 may include a sequence of source fingerprints 751, 752, 753, 754, 755. The validator 700 may walk through sink frames one by one, via their fingerprints, to attempt to validate each frame. The validator 700 may locate the corresponding source frame 752 in the source database 770. To validate or invalidate the frame associated with fingerprint 702, the validator 700 may compare the sink fingerprint 702 to the source fingerprint 752. The validation of the frame may succeed if the sink fingerprint 702 matches the source fingerprint 752 and may fail otherwise.

Figure 7B:
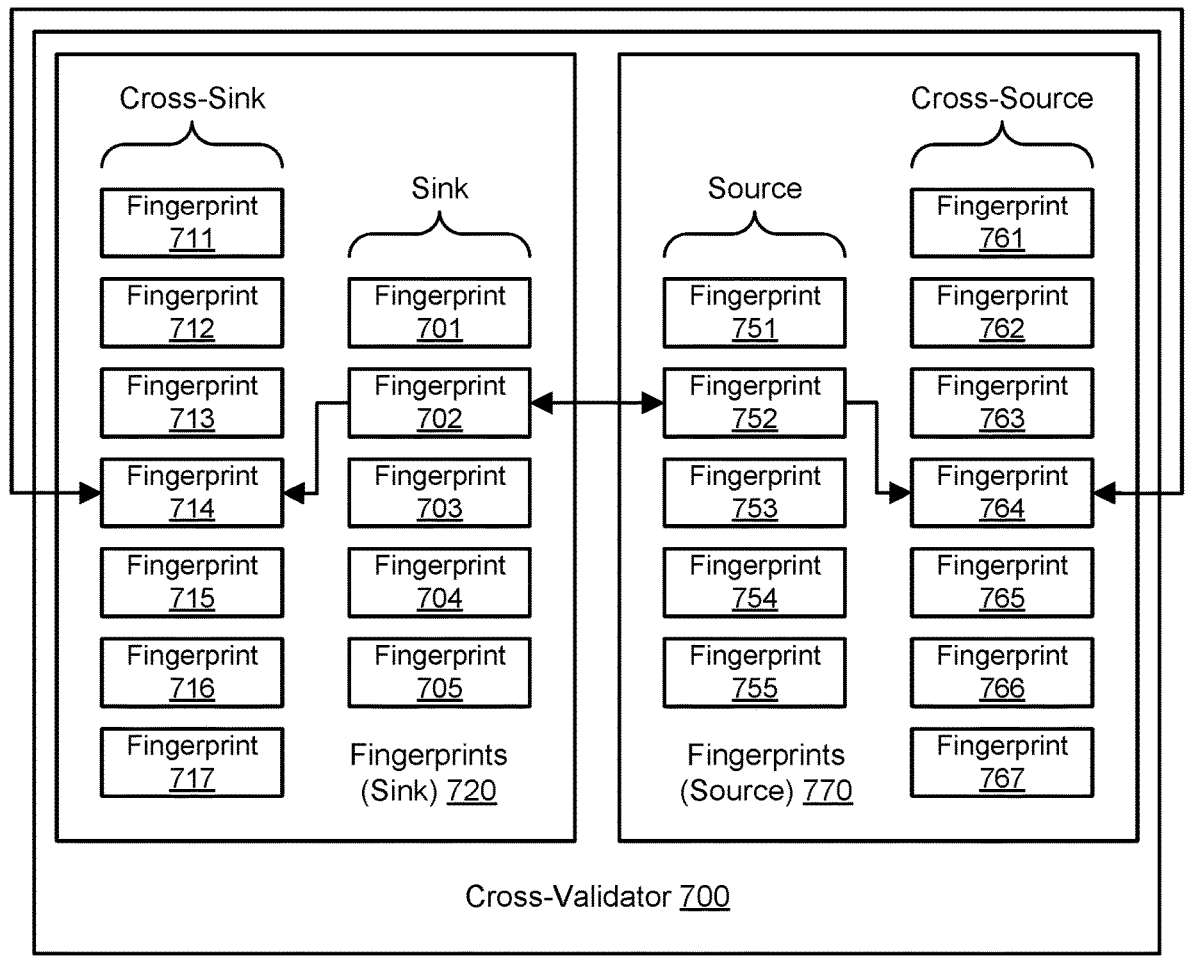
FIG. 7B illustrates a cross-validator usable for validation of media using fingerprinting, according to one embodiment.

FIG. 7B illustrates a cross-validator usable for validation of media using fingerprinting, according to one embodiment. As discussed above, the media validation system 100 may represent a framework that can employ different approaches to validation. For example, a cross-validator 790 may be used to validate media content based on fingerprints to ensure synchronization across streams. As shown in the example of FIG. 7B, the cross-validator 790 may use fingerprints 720 associated with the sink media as well as fingerprints 770 associated with the source media. For example, the sink fingerprints 720 may include a sequence of sink fingerprints 701, 702, 703, 704, 705 and a sequence of cross-sink fingerprints 711, 712, 713, 714, 715, 716, 717. The cross-sink may represent another stream in the fingerprint database. The source fingerprints 770 may include a sequence of source fingerprints 751, 752, 753, 754, 755 and a sequence of cross-source fingerprints 761, 762, 763, 764, 765, 766, 767. The cross-source may represent another stream in the fingerprint database. The cross-validator 790 may walk through sink frames one by one, via their fingerprints, to attempt to validate each corresponding frame. For a particular sink frame represented by fingerprint 702, the cross-validator 790 may linearly map the fingerprint 702 to the fingerprint 714 in the cross-sink domain. The cross-validator 790 may locate the corresponding source frame 752 in the source database 770. The cross-validator 790 may then linearly map the fingerprint 752 to the fingerprint 764 in the cross-source domain. To validate or invalidate the frame associated with fingerprint 702, the cross-validator 790 may compare the cross-sink fingerprint 714 to the cross-source fingerprint 764. The validation may succeed if the cross-sink fingerprint 714 matches the cross-source fingerprint 764 and may fail otherwise.

FIG. 8 illustrates a chart of frame conditions associated with validation of media using fingerprinting, according to one embodiment. In one embodiment, the media validation system 100 may decode and generate human-readable patterns from an elementary stream inside a media container. The patterns may be generated by comparing a sink file or stream to a source file or stream (represented previously validated content). The patterns may be used in various validation approaches. In one embodiment, the media validation system 100 may maintain a whitelist of predetermined hashes representing frame contents. If the media validation system 100 encounters one of these hashes while decoded, it may assume the frame is expected and stop further validation of the frame. For example, various types of fill frames generated by a frame synchronizer may be whitelisted. In one embodiment, whitelist hashes may be limited in number (e.g., up to 26) to maintain the integrity of the pattern generated. In one embodiment, whitelist hashes may be assigned a single lower case character (from 'a' to 'z'.)

A frame may represent the smallest unit of samples in a stream coming out of a decoder, e.g., 1152 samples for audio and a single decoded image for video. As shown in the table of frame conditions 800, the media validation system 100 may recognize three major conditions which may characterize a frame: duplicate, expected, or matched. A duplicate frame may represent an exact duplicate of the previous frame. An expected frame may indicate that the frame happened at the time expected (e.g., its presentation timestamp is expected). A matched frame may indicate that the frame was received without distortions (e.g., noise). The media validation system 100 may consider these binary conditions and may compact them into a single number and/or an ASCII upper-case character, as shown in the condition ID column in the table of frame conditions 800. A frame that is not a duplicate, not expected, and not matched may be deemed to be an entirely unexpected frame (e.g., noise). A frame that is a duplicate, not expected, and not matched may be deemed to be a frame that matched somewhere unexpected. A frame that is a duplicate, not expected, and matched may be deemed to be a duplicate frame that does not match any known frames. A frame that is a duplicate, expected, and not matched may be deemed to be a good (valid) expected frame. A frame that is a duplicate, expected, and matched may be deemed to be a duplicate frame that matches a known frame.

For example, the media validation system 100 may generate the following sample pattern from an elementary stream, where each character represents an individual frame: a, a, b, c, A, A, D, H. Frames 1 and 2 may occur with pattern 'a' from the whitelist database, while frames 3 and 4 may occur with the respective patterns 'b' and 'c' from the whitelist database. Frames 5 and 6 may occur with the pattern 'A' that indicates that the frames are noise. Frame 7 may occur with the pattern 'D' that indicates that the frame is expected and matched with a high score but is not a duplicate. Frame 8 may occur with the pattern 'H' that indicates that the frame is a duplicate of frame 7 and is also expected and matched with a high score. In order to validate such a stream, a user of the media validation system 100 may supply a regular expression. The regular expression may be executed against the generated pattern, and the validation may succeed if the regular expression matches the pattern entirely (e.g., partial matches may yield failed validations). For example, the following regular expression may match the sample shown above and may pass the validation: [a-z]{0,4}[A|D|H]+. However, the following regular expression may not match the sample shown above and may fail the validation with only a partial match: [a-z]{0,4}[D|H]+.

In various embodiments, a variety of different validators may be used with the media validation system 100. In one embodiment, the media validation system 100 may employ a validator that uses linear regression techniques. The linear regression validation may be aimed towards validating an entire file or stream as a whole based on similarity of features, rather than validating the file or stream using frame by frame analysis. Linear regression techniques may be used to more accurately mimic what a human does when validating a media file. The linear regression validator may perform this validation by linearly regressing a sink content to a previously validated source content. In one embodiment, the sink frames are assumed to arrive with a linear rate; however, for various reasons frames can arrive misplaced. Using the linear regression validation, such misplacement may not invalidate the entire sink content. The linear regression validator may generate a graph in which the x axis represents source frame sequence numbers and the y axis represents sink frame sequence numbers compared to the source. In one embodiment, when all these data points are linearly regressed, the result is a straight line. The slope of the linearly regressed data may determine how misplaced the sink frames are by comparison to the source. The y-intercept may determine up-sampling and down-sampling (if any). Using this approach, the sink content may be deemed valid if the slope and y-intercept of the linearly regressed data are close to zero. Duplicate hashes may be ignored in the calculations to prevent accumulation of error in linear regression.

In one embodiment, the media validation system 100 may employ a validator that uses a Kalman filter. Using the Kalman-based validator, a linear validation may be avoided if the stream contains acceptable outliers. The Kalman-based validator may perform Kalman filtering, also known as linear quadratic estimation (LQE), in which a series of measurements (often containing statistical noise and inaccuracies) are analyzed to produce estimates of unknown variables. The Kalman-based validator may adapt to the pattern emitted by the stream and may validate the content even if a small number of frames are deemed invalid. In a similar manner as the linear regression validation, this approach may start by comparing the sink frames to source frames (via their fingerprints) one by one. Scores termed "observations" may be saved. Observations may be run through a Kalman filter to predict (reconstruct) what the original stream pattern was. If its pattern does not match the expected pattern, validation may fail. The media validation system 100 may uses the mean and standard deviation of the Kalman filter's reconstructed stream to validate an input. In one embodiment, any stream with standard deviation less than a unit of score is considered valid.

In one embodiment, the media validation system 100 may employ a validator for input switching. Using input switching, the media delivery pipeline may switch between multiple inputs. The input switching validator may test which frames belong to what inputs. The input switching validator may walk over the sink frames, one by one, and determine what input database currently holds the closest matching fingerprint. The input switching validator may output a pattern which can be tested with regular expressions, as discussed with respect to FIG. 8.

Illustrative Computer System

In at least some embodiments, a computer system that implements a portion or all of one or more of the technologies described herein may include a computer system that includes or is configured to access one or more computer-readable media. FIG. 9 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a media validation system, wherein the media validation system is configured to perform a validation operation to determine, for a first media that is based on a source media, whether a characteristic of the first media is preserved in a second media comprising an encoding of the same source media, wherein the characteristic comprises at least one of level of audiovisual quality, level of detail, noise level, or number of frames, the validation operation comprising to:
generate a first plurality of fingerprints based at least in part on contents of the first media comprising a first plurality of media elements of a particular media type, wherein the first media represents input from the source media to a transcode pipeline or an output of the transcode pipeline, the output determined based at least in part on the input from the source media to the transcode pipeline;
generate a second plurality of fingerprints based at least in part on contents of the second media comprising a second plurality of media elements of the particular media type and encoded by an encoder in the transcode pipeline, wherein the second media represents a different output of the same transcode pipeline to which the first media is input or from which the first media is output based on the same source media;
synchronize the second media with the first media;
perform a comparison of the second plurality of fingerprints to the first plurality of fingerprints based on the synchronization to ensure that fingerprints for the second plurality of media elements are compared to fingerprints for corresponding ones of the first plurality of media elements, wherein the comparison determines whether the characteristic of the first media is preserved in the second media by the encoder in the transcode pipeline; and
validate or invalidate the second media based at least in part on the comparison, wherein validation of the second media indicates that the characteristic of the first media is preserved in the second media.

2. The system as recited in claim 1, wherein the first media is encoded at a framerate, wherein the second media is encoded at the framerate, and wherein the first media is selected for the comparison from a set of validated media based at least in part on the framerate.

3. The system as recited in claim 1, wherein the characteristic comprises synchronization of audio with video.

4. The system as recited in claim 1, wherein the characteristic comprises audiovisual quality.

5. A computer-implemented method, comprising:
generating a first plurality of fingerprints based at least in part on contents of a first media comprising a first plurality of media elements of a particular media type, wherein the first media is based on media elements of a source media that are input to a transcode pipeline;
generating a second plurality of fingerprints based at least in part on contents of a second media comprising a second plurality of media elements of the particular media type, wherein the second plurality of media elements comprise transformed media elements that have been transformed, via the transcode pipeline, from the media elements of the same source media input to the transcode pipeline;
performing a comparison of the second plurality of fingerprints to the first plurality of fingerprints to determine whether a characteristic of the first media is maintained in the second media subsequent to the media elements having been transformed, via the transcode pipeline, to the transformed media elements of the second media, wherein the characteristic comprises at least one of level of audiovisual quality, level of detail, noise level, or number of frames; and determining, based at least in part on the comparison, whether the second media is valid or invalid, wherein validity of the second media indicates that the characteristic of the first media is preserved in the second media.

6. The method as recited in claim 5, wherein the first media represents input to the transcode pipeline, and wherein the second media represents output of the transcode pipeline.

7. The method as recited in claim 5, wherein the first media represents a first output of the transcode pipeline, wherein the second media represents a second output of the transcode pipeline, and wherein the first media is validated for quality prior to performing the comparison.

8. The method as recited in claim 5, wherein the first media is encoded at a framerate, wherein the second media is encoded at the framerate, and wherein the first media is selected for the comparison from a set of validated media based at least in part on the framerate.

9. The method as recited in claim 5, wherein the characteristic comprises synchronization of audio with video.

10. The method as recited in claim 5, wherein the characteristic comprises a level of detail that exceeds a threshold level of detail.

11. The method as recited in claim 5, further comprising:
performing a cross-correlation between the first media and the second media; and
determining a delay between a start of the first media and a start of the second media based at least in part on the cross-correlation, wherein the second plurality of fingerprints is generated based at least in part on the delay.

12. The method as recited in claim 5, wherein performing the comparison comprises:
performing a linear regression of the second plurality of fingerprints against the first plurality of fingerprints, wherein the second media is determined to be valid or invalid based at least in part on output of the linear regression.

13. One or more non-transitory computer-readable storage media storing program instructions that when executed on or across one or more processors, cause the one or more processors to perform:
generating a first plurality of fingerprints based at least in part on contents of a first media comprising a first plurality of media elements of a particular media type, wherein the first media is based on media elements of a media source that are input to a transcode pipeline;
generating a second plurality of fingerprints based at least in part on contents of a second media comprising a second plurality of media elements of the particular media type, wherein the second media comprises output of the transcode pipeline comprising transformed media elements that have been transformed, via the transcode pipeline, from the media elements of the same source media input to the transcode pipeline;
performing a comparison of the second plurality of fingerprints to the first plurality of fingerprints to determine whether a characteristic of the first media is maintained in the second media subsequent to the media elements having been transformed, via the transcode pipeline, to the transformed media elements of the second media, wherein the characteristic comprises at least one of level of audiovisual quality, level of detail, noise level, or number of frames; and
determining, based at least in part on the comparison, whether the second media is valid or invalid, wherein validity of the second media indicates that the characteristic of the first media is preserved in the second media.

14. The one or more non-transitory computer-readable storage media as recited in claim 13, wherein the first media represents input to the transcode pipeline, and wherein the second media represents output of the transcode pipeline.

15. The one or more non-transitory computer-readable storage media as recited in claim 13, wherein the first media represents a first output of the transcode pipeline, wherein the second media represents a second output of the transcode pipeline, and wherein the first media is validated for quality prior to performing the comparison.

16. The one or more non-transitory computer-readable storage media as recited in claim 13, wherein the first media is encoded at a framerate, wherein the second media is encoded at the framerate, and wherein the first media is selected for the comparison from a set of validated media based at least in part on the framerate.

17. The one or more non-transitory computer-readable storage media as recited in claim 13, wherein the characteristic comprises synchronization of audio with video.

18. The one or more non-transitory computer-readable storage media as recited in claim 13, wherein the characteristic comprises a noise level that is less than a specified threshold noise level.

19. The one or more non-transitory computer-readable storage media as recited in claim 13, further comprising program instructions that when executed on or across the one or more processors, cause the one or more processors to perform:
performing a cross-correlation between the first media and the second media; and
determining a delay between a start of the first media and a start of the second media based at least in part on the cross-correlation, wherein the second plurality of fingerprints is generated based at least in part on the delay.

20. The one or more non-transitory computer-readable storage media as recited in claim 13, wherein performing the comparison comprises:
performing Kalman filtering using the second plurality of fingerprints and the first plurality of fingerprints.

* * * * *